United States Patent [19]
Benquet et al.

[11] Patent Number: 5,238,642
[45] Date of Patent: Aug. 24, 1993

[54] PROCESS FOR PRODUCING ENGRAVED MARKINGS ON A MATERIAL IN THE MANUFACTURE OF A FLEXIBLE TUBE

[75] Inventors: Jacques Benquet, Talant; Bernard Schneider, Sainte-Ménéhould, both of France

[73] Assignee: Cebal SA, Clichy, France

[21] Appl. No.: 766,211

[22] Filed: Sep. 27, 1991

[51] Int. Cl.$^5$ .............................................. B29C 59/04
[52] U.S. Cl. ........................................ 264/284; 29/17.3; 264/250; 264/293; 264/294; 425/385; 425/392
[58] Field of Search ............... 264/293, 284, 310, 250, 264/294; 425/385, 392, 402; 29/17.3

[56] References Cited

U.S. PATENT DOCUMENTS

| | | | |
|---|---|---|---|
| 570,728 | 11/1896 | Goodwin | 264/279 |
| 1,856,928 | 5/1932 | Pannier . | |
| 1,940,767 | 12/1933 | Perkins | 101/3 |
| 3,129,457 | 4/1964 | Carter et al. | 264/284 |
| 3,504,067 | 3/1970 | Trecek . | |
| 3,839,514 | 10/1974 | Nauta | 264/1.6 |
| 4,130,623 | 12/1978 | Walter | 264/293 |
| 4,588,465 | 5/1986 | Paciorek | 264/268 |
| 4,917,903 | 4/1990 | Mente | 264/293 |

FOREIGN PATENT DOCUMENTS

| | | | |
|---|---|---|---|
| 1504164 | 4/1969 | Fed. Rep. of Germany . | |
| 2053837 | 3/1972 | Fed. Rep. of Germany | 264/293 |
| 3125208 | 4/1982 | Fed. Rep. of Germany . | |
| 983191 | 2/1951 | France . | |
| 1553858 | 1/1969 | France . | |
| 2377263 | 9/1978 | France | 264/293 |
| 150721 | 8/1984 | Japan | 264/293 |
| 1128977 | 10/1988 | United Kingdom . | |

Primary Examiner—Jan H. Silbaugh
Assistant Examiner—Mathieu Vargot
Attorney, Agent, or Firm—Pollock, Vande Sande & Priddy

[57] ABSTRACT

A process for producing markings or lines engraved on a sheet or a tubular piece (6) made of plastic material or multi-layered metal-plastic material less than 1 mm in thickness, in which the sheet or piece (6) is gripped between a tool (1) bearing one or more marking contour(s) (2, 3) and a resilient support (9), in order to produce the engraved markings or lines. The sheet or piece (6) is at less than 50° C. during the gripping stage, and in the resilient support (9) has a Shore hardness D of between 70 and 120, the markings or lines obtained being produced by plastic deformation with elastic return.

19 Claims, 2 Drawing Sheets

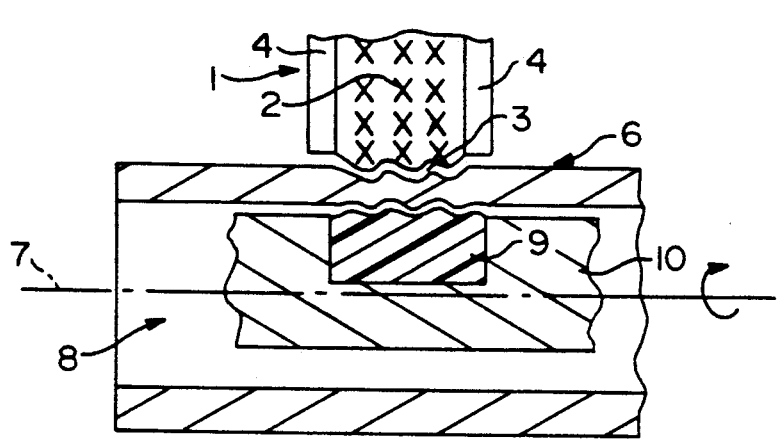
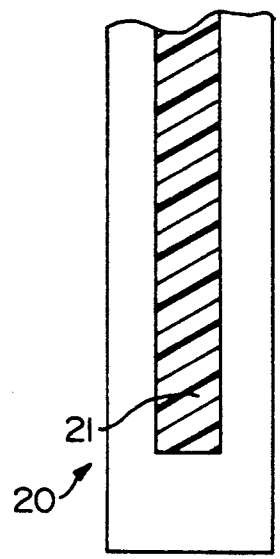
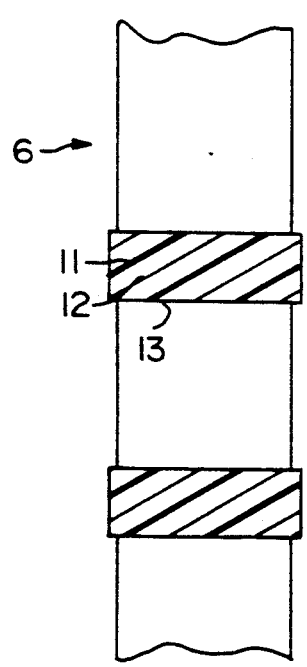
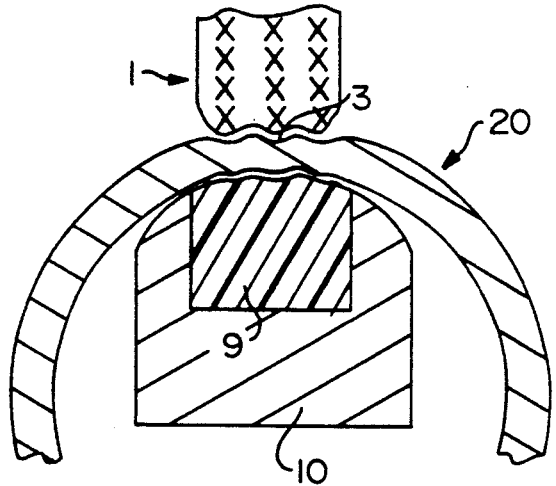
FIG. 1
FIG. 4
FIG. 2
FIG. 3

PROCESS FOR PRODUCING ENGRAVED MARKINGS ON A MATERIAL IN THE MANUFACTURE OF A FLEXIBLE TUBE

FIELD OF THE INVENTION

The invention concerns a process for shaping a sheet or thin tubular piece of plastic or multi-layered metal-plastic material, particularly in the domain of packaging. The term, "multi-layered metal-plastic material" is used to refer to a material, the parallel layers of which consist of at least one inner layer of metal, e.g., of aluminum, and two surface layers of a plastic material.

BACKGROUND OF THE INVENTION

U.S. Pat. No. 4,130,623 discloses a method of heating a sheet of heat shapeable plastic material, preferably PVC, ABS or polyolefin, to a heat shaping temperature which can rise to 350° or 400° F.=176° or 204° C., and of gripping it between a tool which bears marking contours and supporting means forming an elastomeric anvil having a hardness A of approximately 35 to 60, in order to produce on the sheet patterns consisting of contours and hollows. In the case of a PVC sheet, the heat shaping temperature is at least 280° F.=137° C., corresponding to a plastic or softened state.

Applicant has investigated whether it is possible to produce well controlled incised engravings on tubular pieces of plastic material without creating distortions, and, if possible, while avoiding the constraints of a heating operation.

SUMMARY OF THE INVENTION

The invention relates to a process for producing markings or lines engraved on a sheet or a tubular piece made of plastic material or multi-layered metal-plastic material less than 1 mm in thickness, typically between 0.25 and 0.8 mm, in which the sheet or piece is gripped between a tool bearing one or more marking reliefs (6) and a resilient supporting means for the purpose of producing the engraved markings or lines. According to the invention, the sheet or piece is at less than 70° C. and preferably at less than 50° C. during the gripping stage, and the resilient supporting means has a Shore hardness D of between 70 and 120, the engraved markings or lines being produced by plastic deformation with elastic return.

The hollows are obtained without a heating operation, or, as a matter of convenience, on a luke-warm product, this being preferable to a heating operation for mass production and to improve the reproducibility of the results. The marking is effected by slightly exceeding the elastic limit of the gripped plastic material.

The choice of resilient supporting means is particularly important in order to produce engraved markings which are controlled and reproducible. The supporting means according to the invention is much harder than the relatively soft elastomeric supporting means according to U.S. Pat. No. 4,130,623, the hardness A of which is between 35 and 60, equivalent to a Shore hardness D of between 7 and 16. The resilient supporting means is responsible for improving, by compression, the distribution of the elongations when the deformations are made for the purpose of producing engraved markings on the sheet or piece, and, concurrently, to avoid local flattening and thinning which would impair the mechanical resistance and impermeability of the marked layer. An engraved deformation is thus produced without unacceptable distortion of the non-heated plastic material, which is thus rather rigid, whereas the prior art uses a heated state in which the material is much more deformable and even soft.

If the hardness of the resilient supporting means is less than 70 Shore D, marked waves are produced which correspond to the engraved patterns of the marking device, the elongation being excessive there. An impression of waves is produced, and this is unacceptable with markings which serve identification or decoration purposes, pronounced geometric distortions being unacceptable.

If the hardness of the supporting means is too great, flexing or twisting may occur. In fact, there is a high degree of compression in the bottom of the hollows, i.e., between the end of the marked contours and the supporting means which is too hard, but the sheet or marked piece penetrates into this supporting means to only a small extent, so that its lateral sides are not supported. When there is a significant local thinning at the bottom of the hollows, flexing can be observed on the sheet or tube which corresponds to the main orientation of the marking contours.

It is generally preferably for the sheet or piece to be at a temperature of at least 15° C. when it is being marked during the gripping stage. A lower temperature causes a reduction in the ductility which can affect the capacity of the sheet or piece to be susceptible to engraved deformation.

Polyolefins are particularly suited to this kind of engraved marking. With low density polyethylene, the Shore hardness D of the supporting means is preferably between 85 and 110. For high density polyethylene, the Shore hardness D of the supporting means is preferably between 100 and 120.

The resilient supporting means is preferably made of a material selected from the group consisting of polyurethane, natural or/synthetic rubber, silicones, and charged silicones.

The supporting means is preferably in the form of an insert supported and flanged by a rigid piece, a steel piece, for example. The insert is then preferably pressed quite close to the engraved deformations which it must contain and control; in practice it is between 1 and 5 mm wider than the useful width of the marking outlines.

With frequent use it is preferably to use an insert of this kind for marking outlines with a useful height, or penetration height, of between 0.2 and 0.6 mm, so as to produce engraved markings or lines which are between 0.05 mm and 0.2 mm in depth.

It is convenient to adjust this penetration height or "useful height" of the marking outlines by means of a base surface or base of the outlines which comes to rest on the surface of the sheet or piece to be marked, be this of plastic or metal-plastic material.

It is particularly worthwhile to place the part of a tubular piece thus marked between the longitudinal creases framing such part.

To this end, the tubular piece is first marked with two laminated longitudinal folds before inserting the engraved markings or lines, the folds having at the top before inserting the engraved markings or lines, the folds having at the top thereof an outer striction hollow, i.e., a reduction in section resulting from extension of a test plate, which is between 2% and 15% the thickness of the piece in depth, the folds then being elastically hinged.

The marking process according to the invention is used in the manufacture of flexible tubes, a tubular piece forming the blank of the flexible skirt of the tube, and the blank being marked with engravings after having possibly been provided with longitudinal folds prior to fixing, typically by molding, the plastic head of the tube onto one end of the blank.

The process is thus used on tubular blanks which are between 0.2 and 0.6 mm in thickness, the top layer to be marked being at least 0.2 mm in thickness in the case of a multi-layered blank, so as not to impair the barrier layer.

The invention permits simple renewal at ambient temperature, at all events at less than 70° C., of the surface appearance and state of thin treated pieces, in particular the skirts of flexible tubes. Decorations of engraved markings or lines are obtained without recourse being made to impression; they thus permit improved gripping, the marking appearing as corrugations with rounded peaks. The combination of engraved markings or liens and longitudinal folds marked by a fine outer stricture produces tubes of improved dimensional stability and of a particular geometry, some of their facets having an engraved decoration or gripping means. Finally, engraved marking can be done on an already decorated surface, without destroying it. In particular, it is possible to use a rotatable embossed roller to produce a complex marking consisting of intersection engraved curves. The dispensability of heating is a significant advantage.

BRIEF DESCRIPTION OF THE DRAWINGS

In order that the invention may be more clearly understood, a detailed description will now be given with reference to the accompanying drawings.

FIG. 1 shows a longitudinal section of a tube in the course of being marked.

FIG. 2 shows a side view of the tube after it has been marked circularly.

FIG. 4 shows a longitudinally marked tube, FIG. 3 showing the arrangement of the markings of such tube.

DESCRIPTION OF PREFERRED EMBODIMENT

EXAMPLE 1

Figure 5:
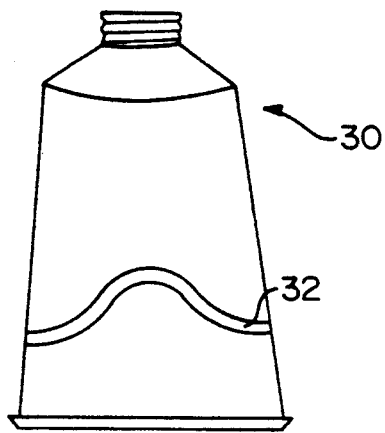
FIG. 5 shows a side view of a third flexible tube which has markings in sinuous hollows.

(FIGS. 1 and 2):

FIG. 1 shows a rotatable embossed steel roller 1 which has intersecting contours 2 called "diamond points" 3, these small pyramidal points 3 being 0.4 mm in height. The embossed roller 1 is flanged by two circular cylindrical base surfaces 4 which are coaxial with the roller, the surfaces 4 resting against the tube 6 during the marking operation. The tube 6 is made of high density polyethylene and is 40 mm in diameter and 0.5 mm thick, and has been predecorated in black. It is rotated about its axis 7 a temperature of between 18° and 23° C., thus being gripped between the rotating embossed roller 1 and a fixed counter-support 8 formed by an insert 9 embedded in a rigid support 10 with which is is flush or beyond which it projects less than 0.2 mm. Three sets of tests have been carried out relating to insert 9.

First of all, a conventional polyurethane insert 9 with a Shore hardness D equal to 60 was tested. On the marked tubes 6, the geometry of the entire marking was noted as being annular zones 11 which were each 5 mm in width, shown in FIG. 2, hollows 12 between pyramidal reliefs 13, said reliefs being strongly marked and about 0.2 mm high, and the annular transverse zones 11 being distended to a diameter of 41 mm. A sectional study reveals that the marking produces in the hollows 12 local thinnings of the tube wall 6, with minimum thicknesses of between 0.35 and 0.4 mm.

A PU insert 9 according to the invention, with a Shore hardness of 90 and with the same marking arrangement, was then tested. The tubes 6 obtained had hollows 12 which were quite regular and only 0.1 mm, each annular zone 11 being slightly swollen to a diameter of 40.5 mm. In section, it can be seen that the local deformations of the wall of the tubes are regular, the thickness being between 0.45 and 0.5 mm. Moreover, in the preceding case, there is no impairment to the black decoration.

A third test was carried out with a steel insert 9, also outside the invention. Tubes 6 were obtained which were marked with grooves, and which had hollowed out bottoms 12 which were thinned to 0.3 mm in local thickness. Marking of a semi-circumference of the tube resulted in pronounced flexing.

EXAMPLE 2

(FIGS. 3 and 4)

An embossed roller with the same geometry as above, but without the base surface or support surface, and also at ambient temperature, was used to mark engraved "diamond points" on a tube 20 along a longitudinal zone 21 which was 5 mm in width. For the marking operation, the tube 20, which was also made of high density polyethylene and which was 40 x the thickness 0.5 mm in diameter, was entrained longitudinally between the embossed roller 1 and the insert 9 embedded in a fixed rigid support 10, gripping of the embossed roller producing, as before, re-entry of the "diamond points" 3 into the tube 20 or useful height of contours 3 of 4 mm. With the three kinds of insert 9 tested in Example 1, similar results were noted. The PU insert 9 with Shore hardness of 90 gives a zone which is marked with rectilinear edges, without the tubes 20 being offset from their axes, and with an enveloping surface which has a low local excess thickness (0.2 mm).

EXAMPLES 3 TO 3

Figure 6:
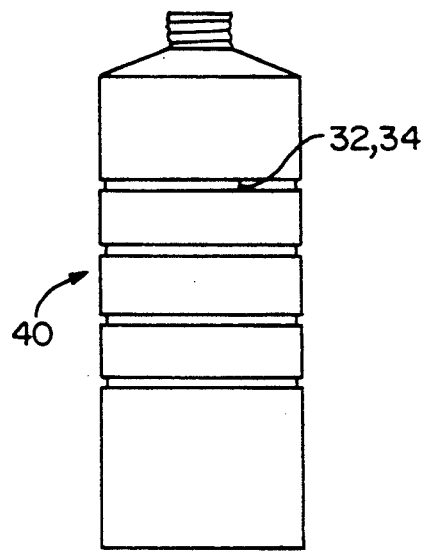
FIG. 6 shows a side view of a fourth tube which is marked with a narrow embossed roller with cylindrical circumference.
Figure 7:
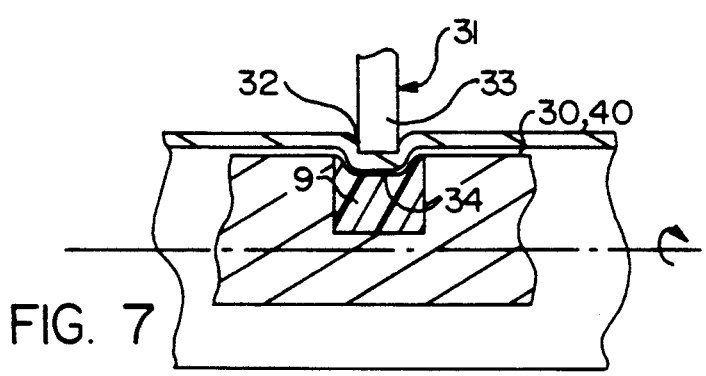
FIG. 7 shows the arrangement for marking of the second and third tube, a longitudinal section of the tube being shown which is in the course of being marked.

(FIGS. 5 to 7)

FIGS. 5 and 6 show tubes 30 and 40 which were previously decorated in black and which had an initial diameter of 40 mm X an initial thickness of 0.5 mm. The tubes were engraved by using a narrow metal embossed roller 31 with a circular cylindrical circumference 33 with a width of 1.2 mm, with a countersupport in the form of a PU inset 9 with a Shore hardness D equal to 90, 4 mm in width, embedded and centered relative to the support end or circumference 33 of the embossed roller 31 (FIG. 7). The tube 30 or 40, had a temperature of between 20° and 30° and was rotated on itself, while its wall was clamped between the embossed roller 31 and the insert 9 which produced on the tube 30 or 40 an engraved groove 32 which was 1 mm in width and 0.15 mm in depth at the diameter. The bottom 34 of the groove was flattened and thinned to 0.45 mm in thickness.

It is noted that the grooves 32 of the rubes 30 or 40 are perfectly regular and in no way impair the black surface. The tube 30 was then sealed at the bottom end. The sinuous groove 32 was obtained by superposing displacements along the tube during the marking operation and by rotating it. The tube 40 has four grooves 32 which are spaced 10 mm apart. It has no overall flexing and the bottoms of the grooves 32 are all slightly less than 39.85 mm in diameter.

These examples 3 and 4 show the flexibility of the process: use of an embossed roller to produce a marking or line smoothly engraved, the production of curves in winding hollows, adherence of the geometry obtained of the hollows to the selected marking conditions (geometry and outlines of the embossed roller for marking, insert, gripping).

EXAMPLE 5

Figure 8:
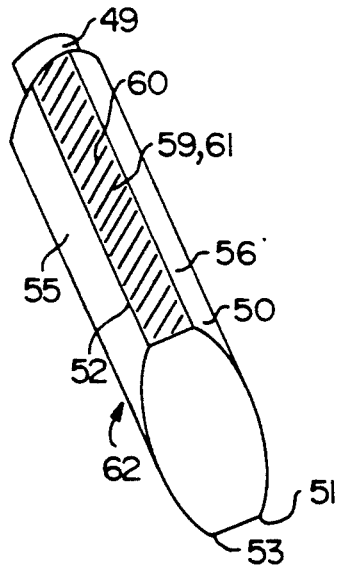
FIG. 8 shows a perspective view of a fifth tube which has longitudinal folds and portions marked in hollows portions.
Figure 9:
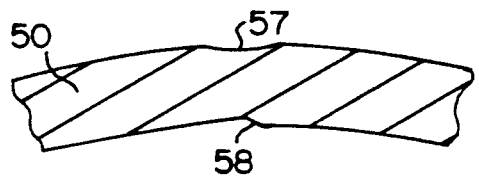
FIG. 9 shows a cross-section of one of the afore-mentioned creases in unfolded position.

(FIGS. 8 and 9):

FIG. 8 shows a tube 62 which has a skirt 50 decorated on the outside in green, 0.5 mm in thickness and made of high density polyethylene, the oppositely disposed folds 61 and 52 and then 53 and 4 having been produced by two successive rolling operations at ambient temperature, the second of these operations flatly gripping the blank which is angularly offset relative to the first rolling operation. The rolls were 0.95 mm apart, i.e., 1.9 times the thickness of the blank. After pressing the large convex surfaces 55 and 56, a fine white hollow line was noted at the location of each fold. A study in section of a straight section of the unfolded blank 50 reveals that each white line is an outer striction surface such as 57 in FIG. 9, with a depth between 0.25 and 0.03 mm. An unevenness 58 is also noted inside the fold which is produced by the folding operation with compression. It has been shown that hundreds of folding operations of such a sample present no risk in practice.

After preparation of folds 51 to 54, each small face, such as 59, which was 5 mm in width was passed, at ambient temperature, between a rotating embossed roller with oblique needle-shaped outlines with longitudinal pitch of 1 mm and an embedded PU insert of Shore hardness 90, the contours projecting by 0.3 mm and the gripping being such that the bottom surface of the embossed roller bore against the face 59. On the faces 59, alternating skimming contours 60 and hollows 61 were produced which where 0.07 mm in depth, forming a milled region 59 which improves gripping of the tube and which has a decorative worth, while the folds 51 to 54 improve elastic stability of the tube, i.e., return to its initial shape after pressing. The folds 51 to 54 and the engraved marking of the small faces 59 were made on the blank of the skirt 50 prior to the head 49 being molded to produce a flexible tube 62.

The process for engraved marking according to the invention is used, in particular, in the manufacture of flexible tubes for the cosmetics and pharmaceuticals industries, in hygiene, for the food industry and for repair and maintenance products. The process also makes it possible for the blind to indentify contents from the contours of the tubes.

We claim:

1. A process for producing engraved markings (12, 13, 32, 61) in a piece (6; 20; 30; 40; 50) less than 1 mm in thickness and made of material comprising at least one layer of plastic, in which said piece (6; 20; 30; 40; 50) is pressed between a tool (1; 31) bearing at least one marking relief (2; 3; 33) and a resilient supporting means (9) for the purpose of producing said engraved markings (12, 13, 32, 61), wherein said piece (6; 20; 30; 40; 50) is at a temperature of less than 50° C. during pressing, and said resilient supporting means (9) has a Shore hardness D of between 70 and 120, whereby said engraved markings (12, 13, 32, 61) are produced by permanent plastic deformation followed by elastic return of said material.

2. A process according to claim 1, wherein said material is a multi-layered material comprising at least one metal layer sandwiched between two plastic surface layers.

3. A process according to claim 1, wherein said piece (6; 20; 30; 40; 50) is at a temperature of at least 15° C. during said pressing stage.

4. A process according to claim 1, wherein said plastic layer which is disposed on a side of said marking relief (2, 3, 33) is a polyolefin.

5. A process according to claim 4, wherein said polyolefin is low density polyethylene, the shore hardness D of said supporting means (9) being between 85 and 110.

6. A process according to claim 4, wherein said polyolefin is high density polyethylene, the Shore hardness D of said supporting means (9) being between 100 and 120.

7. A process according to claim 1, wherein said resilient supporting means (9) is made of a material selected from the group consisting of natural and synthetic rubber.

8. A process according to claim 7, wherein the synthetic rubber is polyurethane.

9. A process according to claim 7, wherein the synthetic rubber is silicone.

10. A process according to claim 7, wherein the synthetic rubber is charged silicone.

11. A process according to claim 1, wherein said resilient supporting means (9) is a supported insert (9) bordered by a rigid piece (10).

12. A process according to claim 11, wherein said insert (9) is 1 to 5 mm greater in width than a marking portion of said marking relief (2, 3, 33).

13. A process according to claim 11, wherein said marking relief (2, 3, 33) has a useful height of between 0.2 and 0.6 mm, so as to produce engraved markings (12, 12, 32, 61) having a depth from 0.05 to 0.2 mm.

14. A process according to claim 13, wherein said useful height of said marking relief (2, 3) is adjusted using a base surface (4) which is wider than that just pressed on the surface of said piece (6) and rests against the surface of said piece.

15. A process according to claim 1, wherein said tool (1, 31) is rotatable.

16. A process according to claim 1, wherein said piece (50) is tubular and is initially marked with two laminated longitudinal folds (51, 52) for framing said engraved markings (61), said folds (51, 52) having a top provided with an external striction hollow line (57) which has a depth of between 2% and 15% of the thickness of said piece (50), said folds being elastically hinged.

17. A process according to claim 16, wherein said tubular piece (50) is a skirt (50) of a flexible tube (62), and wherein a head made of plastic material (49) is then molded on an end of said skirt.

18. A process according to claim 17, wherein said skirt (50) is polyolefin and has a thickness which is between 0.2 and 0.6 mm, or is multi-layered, the top layer to be marked being at least 0.2 mm in thickness.

19. A process according to claim 15, wherein said piece (50) is tubular and is initially marked with two laminated longitudinal folds (51, 52) which have to frame said engraved markings (61), said folds (51, 52) having a top with an external striction hollow line (57) which has a depth of between 2% and 15% of the thickness of said piece (50), said folds being thus elastically hinged.

* * * * *